US009436656B2

(12) United States Patent
Boehl et al.

(10) Patent No.: US 9,436,656 B2
(45) Date of Patent: Sep. 6, 2016

(54) METHOD FOR SYSTEMATICALLY TREATING ERRORS

(75) Inventors: Eberhard Boehl, Reutlingen (DE); Bernd Becker, Stuttgart (DE); Bernard Pawlok, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 1011 days.

(21) Appl. No.: 13/637,753

(22) PCT Filed: Mar. 16, 2011

(86) PCT No.: PCT/EP2011/053969
§ 371 (c)(1),
(2), (4) Date: Dec. 11, 2012

(87) PCT Pub. No.: WO2011/120805
PCT Pub. Date: Oct. 6, 2011

(65) Prior Publication Data
US 2013/0080104 A1 Mar. 28, 2013

(30) Foreign Application Priority Data
Mar. 31, 2010 (DE) .................. 10 2010 003 561

(51) Int. Cl.
*G06F 17/00* (2006.01)
*G01D 5/244* (2006.01)
*G01D 5/245* (2006.01)

(52) U.S. Cl.
CPC ............ *G06F 17/00* (2013.01); *G01D 5/2449* (2013.01); *G01D 5/2457* (2013.01); *G01D 5/24452* (2013.01); *G01D 5/24471* (2013.01)

(58) Field of Classification Search
CPC G06F 17/00; G01D 5/2449; G01D 5/24452; G01D 5/24471; G01D 5/2457
See application file for complete search history.

(56) References Cited

U.S. PATENT DOCUMENTS 5,117,681 A 6/1992 Dosdall et al.
5,973,320 A * 10/1999 Maruyama ............ G01B 11/26
250/214 PR (Continued)

FOREIGN PATENT DOCUMENTS

| CN | 1721856 A | 1/2006 | |
| CN | 101652636 A | 2/2010 | |
| DE | 199 33 844 | 1/2001 | |
| DE | 10017107 A1 * | 10/2001 | ........... F02D 41/009 |
| DE | 100 63 755 | 7/2002 | |
| DE | 10154155 A1 * | 5/2003 | ........ F02D 41/0097 |
| DE | 10 2005 047 922 | 4/2007 | |

(Continued)

OTHER PUBLICATIONS

International Search Report, PCT International Application No. PCT/EP2011/063969, dated Dec. 6, 2011.

*Primary Examiner* — Alexander Satanovsky
*Assistant Examiner* — John Kuan
(74) *Attorney, Agent, or Firm* — Norton Rose Fulbright US LLP

(57) ABSTRACT

A method for systematically handling errors, and an assemblage for carrying out the method, are presented. The method serves for systematically handing errors for a goniometer in the context of the transfer of position data with a position transducer, the position transducer possessing markings that are sensed with at least one sensor; a profile being deposited in a memory region in connection with said markings; the position transducer generating as a function of its position, by way of the markings, position signals that carry, as data, parameters that are deposited into a further memory region beginning with an address pointer value of 0; said address pointer being incremented with each position signal; and a synchronization between the position signals and the profile being created, and the values stored in the profile being used to modify the number of pulses outputted to the goniometer.

10 Claims, 4 Drawing Sheets

(56) References Cited

U.S. PATENT DOCUMENTS 7,046,176 B2 * 5/2006 Okamuro ........... G01D 5/24409
250/231.14
2009/0315544 A1 * 12/2009 Takahashi ............. F16C 41/007
324/207.25

FOREIGN PATENT DOCUMENTS

| EP | 1070964 A2 | 1/2001 |
| EP | 1 400 785 | 3/2004 |
| JP | 01277662 A | 11/1989 |

* cited by examiner

METHOD FOR SYSTEMATICALLY TREATING ERRORS

FIELD OF THE INVENTION

The present invention relates to a method for the systematic handling of errors for a goniometer in the context of the transfer of position data, and to an assemblage for carrying out the method.

BACKGROUND INFORMATION

In the context of controlling combustion engines, sensors that indicate a position of the engine are used. It is usual, for example, by way of an encoder wheel installed fixedly with the crankshaft, to cause signals to be generated by a sensor at specific angles whenever a marking begins or ends. One or more markings on the encoder wheel are usually omitted so that a synchronization with the present engine position can be performed.

German Patent Application No. DE 100 637 55 A1 describes how a synchronization with a current engine position can be performed, one or more markings on the encoder wheel usually being omitted. Because the marking positions reproduce the present engine position only very coarsely, however, an angle base is generated with which, by way of an accurately defined number of pulses between two sensor signals, intermediate positions can also be determined. It is necessary for this, inter glia, to predict the time span until the next sensor signal.

German Patent Application No. DE 10 2005 047 922 A1 describes a method for determining an angle difference between a first and a second angle event. In the method, tooth times of preceding teeth are ascertained and successively added up to a spacing in time, the tooth angle being added to the difference angle, and the tooth times being ascertained from the tooth times of a preceding working cycle, multiplied by a correction factor.

Various kinds of errors can occur in the transfer of position signals and angle signals. Systematic errors in the transfer of angle data by way of an encoder wheel in a combustion engine can arise, for example, from the fact that teeth of the encoder wheel are broken off, or that the spacing between said teeth is not identical or appears to be non-identical. "Appears to be non-identical" is understood to mean, for example, that two teeth are missing, and that while the gap may be exactly three times as large as the spacing without the gap, signal sensing and transfer nevertheless does not reflect that exact ratio because of distortions. Such conditions have hitherto been taken into account only an approach involving exclusively software.

SUMMARY

In accordance with example embodiments of the present invention, the context of an encoder wheel having teeth, consideration of systematic errors is ensured by the fact that a profile of the tooth spacings is stored in a first memory region. In this profile, one memory location is reserved for each tooth spacing, in which location is provided a field that contains the number of nominal spacing values. Normal tooth spacings have the value 1. If two teeth are missing, the value 3 is entered. A deviation from the ideal spacing is entered in a further field of the aforesaid memory word.

If provision is made, for example, for more-accurate position determination, that a number n of pulses is to be outputted between two teeth, it is then possible to enter into the field for the deviation from the ideal state a positive or a negative number that signifies additional or superfluous pulses for that increment.

Upon rotation past a sensor, the encoder wheel generates pulses that are sent to an evaluation circuit, namely the circuit assemblage presented. Each of these input pulses, upon arrival, is given a time stamp by a time base. Difference times are calculated from the difference of the time stamps. These measured parameters, such as the time stamp for a received pulse and the time span between two pulses, are stored in two further memory regions.

Because the motor's position is not known when it starts up, no relationship to the profile can be created at this time. The values for the time stamps and the values for the time spans are therefore stored in the corresponding memory regions, starting with the address pointer value 0 and incrementing said address pointer with each relevant sensor signal. Only one edge of the sensor, viewed in a specific direction (High-Low or Low-High) is regarded in this context as "relevant." In some circumstances, different address pointers are provided for all three memory regions. A gap is not yet definitely recognized as such, and is therefore regarded as an increment. When the position is known as a result of recognition of the gap, possibly only after the gap itself, the CPU sets the address pointer for the profile in a corresponding relationship to the memory region for the increment duration.

In order to allow sums of the increment durations to be easily calculated, provision can be made, in terms of storage of the time stamps, that entries of calculated time stamps for the missing teeth are also performed for the gaps. The result is that in the context of a calculation over multiple increments, there is no need to differentiate as to whether or not a gap is included. The number of memory entries for the time stamps can therefore be greater, by an amount equal to the number of missing teeth, than the number of memory entries for the time duration. In this case the memory region for time stamps must possess its own address pointers. When a gap is provided in the profile, the corresponding address pointer for the time stamp is incremented with virtual time segments by an amount equal to the number of virtual increments, i.e., to the corresponding entry of the profile. The memory entries that were skipped are subsequently filled, on a regular basis, in such a way that a homogeneous distribution of time spans over the virtual increments occurs.

This also represents a difference between a software- and hardware-based approach. Because the position of the gap is not known at startup, any virtual entries that may be provided must be inserted subsequently. The shift in memory thereby made necessary can result in data consistency problems, since both the hardware and the CPU have write and read access to the same data. The result of this can be that, in some cases, the virtual entries must be dispensed with, in particular for storage of the increment duration. The method presented, with no consideration of virtual entries for the increment duration, is a sensible choice in particular for a hardware approach.

In the context of an electric motor it is usual to use three sensors, the data of which can be evaluated separately for the purpose of detecting the motor direction. If the sensors are disposed in exactly such a way that the polarization changes do not occur at the same angle, and the angle values up to the point of the next polarization change occur uniformly, the three signals can be combined, for example, antivalently (EXOR) for speed detection and position detection. The angle between two successive edges of the combined input signal thus obtained should, by design, be as identical as possible.

If an electric motor having permanent magnets possesses only one pole pair over a 360° angle, i.e., a South pole over 180° and a North pole over the remaining 180°, then three sensors S0, S1, and S2 are disposed so they are each offset 120° from one another. If the sensors react to the direction of the magnetic field, a signal change will then occur every 60° at exactly one sensor. Antivalent combination of the three signals with one another then produces a combined signal Sx.

Motors having permanent magnets that have multiple pole pairs disposed over one 360° revolution are usual. If a motor having eight pole pairs is provided, for example, then a North pole and a South pole are disposed in alternating sequence each at an angle of 22.5°. For a motor of this kind having eight pole pairs, one electrical revolution (i.e., one South pole and one North pole) is achieved after only 45°, and eight electrical revolutions therefore occur for one mechanical revolution.

The sensors in such a motor having eight pole pairs are typically disposed with a 15° offset. The sensors can be oriented toward the permanent magnets and can react to the direction of the magnetic flux, or to an additionally mounted metallic encoder wheel.

Here as well, the same number of position pulses can be uniformly distributed over each of these increments so that a more accurate position base is available. It is likewise possible to account for design-related deviations by way of a larger or smaller number of pulses. The corresponding entries are to be provided in the profile, as in the case of combustion engines. Even failure of a sensor can accounted for by entering, in the profile for the number of virtual increments, a 2 at that point where a sensor signal is missing. This is then, for example, a sequence 1-1-2-1-1-2- . . . , which continues periodically. Direction recognition is then even a possibility.

After synchronization of the address pointer for the data values with the address pointer of the profile, after each signal change Sx the increment in which that change is located is known. The deviations (typically programmed by the CPU) between the number of pulses and the target number of pulses are fetched predictively from the profile, and taken into account in the corresponding increment upon the emission of pulses. The deviation can be positive or also negative. More or fewer pulses are then correspondingly outputted to the position transducer.

If a sensor has failed, the profile 1-1-2-1-1-2- . . . is likewise read in predictively, and the value (1 or 2) read in the profile is used as a factor with which the nominally provided pulses are multiplied. The value for the systematic deviation is then added (positively or negatively), and the value of the pulses to be outputted for the position transducer are thus determined.

Consideration is also given to the fact that in addition to mechanical influences of the encoder wheel or sensors, in the case of electric motors electrical influences can also have an effect. In a combustion engine, for example, a gap with two missing teeth does not necessarily appear in the electrical signal to be three times as long as a normal tooth spacing without a gap. These electrical distortions can also be taken into account in the systematic deviations in the same way, and also stored in the profile.

In order to predict a time interval one can, for example, assume that the present increment will last exactly as long as the previous one if no teeth are missing, i.e., a 1 is entered in the profile in each case. This is expressed as:

$$CDT\_TX = DT\_T * QDT\_T,$$

where CDT_TX is the interval duration to be predicted, DT_T the duration of the last measured time interval, and QDT_T the ratio between the setpoints or measured values of the interval to be predicted and the last interval. Because the measured values for the interval to be predicted may not yet exist, the periodicity of the events is utilized (when measured values are used), and QDT_T is then calculated from the ratio of the measured values of the increments of at least one electrical revolution. One complete mechanical revolution (eight electrical revolutions) can of course also be used for the prediction. Looking only at the setpoints, this QDT_T ratio is then calculated from the number of pulses stipulated per interval, plus the systematic deviation. Taking this value correspondingly for each of the two intervals being considered, and correlating the two values, yields QDT_T.

When a gap is present, the number of pulses defined per interval can correspondingly be multiplied by the number (indicated in the profile) of virtual increments, and the correction value correspondingly added. By correlating with one another the values thereby calculated for the intervals in question, one correspondingly obtains the value QDT_T for a gap as well, and thus, using the same formula, the expected duration of the instantaneous interval can be predicted even in the context of gaps. In a further embodiment of the invention, QDT_T can also be calculated from the measured ratios of the pulse durations, as already described earlier, especially when the measured values of periodically occurring events relate to the same increments, i.e., only one or several periods back.

For example, the measured values for a periodic time span can be stored, and the ratio of the relevant intervals, for example, one period previously can be determined. This measured ratio can then, as described therein, also be multiplied by the last measured interval time span, and an average error can also be added to the measured interval time span before carrying out the multiplication. Systematic deviations are then already contained in the ratio of the measured values. The instantaneous time interval can thus be predicted very precisely.

When what is important, however, is to resolve the relevant time interval even more finely in terms of the positions (angles) that are reached, by applying control to, e.g., a goniometer or more generally a position counter with pulses, an attempt will then also be made to increase the number of pulses generated for a systematically larger segment, and correspondingly decrease it for the systematically smaller segment. The average number of pulses can then be corrected by way of the deviation predefined in the profile. For that purpose, this correction value (positive or also negative) can be added to the fixed average number, and distributed uniformly over the interval.

The present invention presented thus makes possible, at least in some of the embodiments, a circuit assemblage for taking into account systematic errors of position transducers, in which, for typically periodically provided position signals, the average measured spacing between two position signals is taken into account in a profile that is stored in the first memory region. Both the systematic absence of position signals and the systematic deviation of the measured position values or angle values can be taken into account in this profile.

In the method described, provision is typically made that a synchronization between the parameters in the further memory region and the profile in the first memory region is created by the fact that the two address pointers are identical to one another except for a difference, and the values stored in the profile are used to modify the number of pulses outputted to the goniometer.

Synchronization is achieved, for example, by the fact that an address pointer is correspondingly set by the profile.

The current memory region for the profile is indicated by the address pointer; a central computing unit or CPU usually sets this address pointer in relation to other address pointers using currently measured values, so that a synchronization is created between the measured data and the profile, and systematic deviations in the calculation of more-accurate position signals, and for the prediction of time intervals, are taken into account.

The profile can indicate, for example, a factor by which the spacing between two position signals is to be multiplied. A signed value that corresponds to an incremental deviation can likewise be indicated in the profile.

Provision can further be made that the average value of sub-position signals is multiplied by the aforesaid factor, and the aforesaid incremental deviation is added to this product. The value thereby corrected is used for the generation of sub-position signals.

Further advantages and embodiments of the present invention are evident from the description herein and from the figures.

It is understood that the features described above and below can be used not only in the respective combination indicated, but also in other combinations or in isolation, without leaving the context of the present invention.

DETAILED DESCRIPTION OF EXAMPLE EMBODIMENTS

The present invention is schematically depicted in the figures on the basis of example embodiments, and is described in detail below with reference to the figures.

Figure 1:
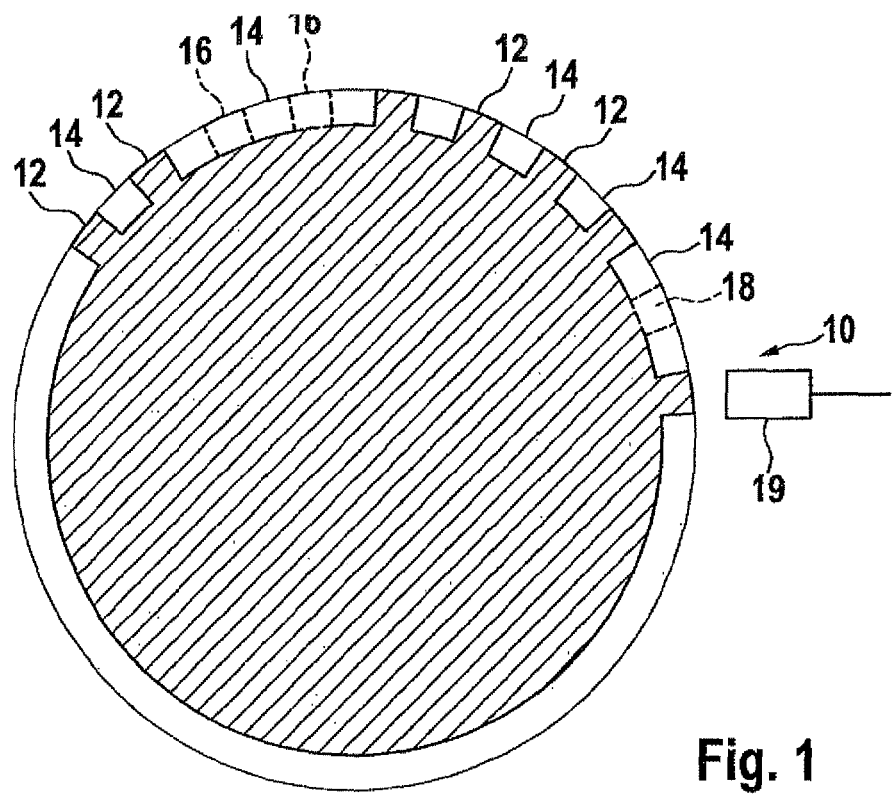
FIG. 1 schematically depicts an encoder wheel and a sensor for generating signals that represent an angular position of a shaft.

FIG. 1 depicts an encoder wheel or pulse generator wheel 10. This has a number of teeth 12, between which are provided respective tooth spacings 14. The depiction further shows two gaps 16 provided in one tooth spacing 14, and an additional gap 18 in another tooth spacing 14.

Tooth spacings 14 serve to unequivocally characterize a specific position of encoder wheel 10 or of a shaft connected to encoder wheel 10.

Normal tooth spacings have the value 1. When two teeth 12 are missing, for example because of the two gaps 16, the value 3 is entered. The additional gap 18 has the value or entry of 2.

Teeth 12 travel past a sensor 19, and sensor 19 outputs a High signal level when a tooth 12 is located directly in front of sensor 19, and a Low signal level when a gap 16 or 18 is located directly in front of sensor 19. The output signal of sensor 19 is reproduced, by way of example, in FIG. 2.

Figure 2:
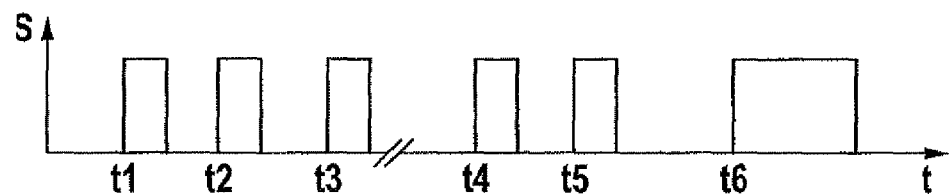
FIG. 2 shows signals of the sensor of FIG. 1.

In FIG. 2, the output signal S of sensor 19 is plotted against time t. As is evident, the signal S of sensor 19 jumps from a Low level to a High level at time t1, and maintains that High level as long as tooth 12 is moving past sensor 19. When tooth 12 has then moved past sensor 19, the signal level S drops back to a value of 0. At time t2 the signal level then jumps back up to the High value, since the next tooth 12 is appearing in front of sensor 19. A jump in the signal level S is shown correspondingly in FIG. 2 at the respective times t1, t2, t3, t4, t5, and t6. The signals that are shown at times t1, t2, t3, t4, t5 pertain to a normal rotation of the shaft in one direction. A reversal of the rotation direction of the shaft occurs between times t5 and t6. The consequences arising therefrom will be discussed later on.

Figure 3:
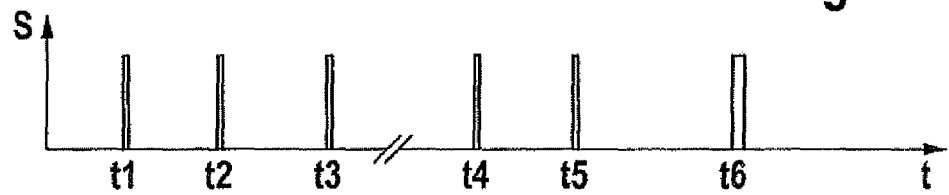
FIG. 3 shows post-processed signals that are derived from the signals of FIG. 2.

For further processing of the signals of sensor 19, what is taken into account for post-processing is not the signals according to FIG. 2, but instead only the positive switching edges, i.e., from the Low to the High level. FIG. 3 shows the signals in reaction to these positive switching edges from signal level S=Low to signal level S=High. The immediate sensor signals of FIG. 2 are converted into the signals that are shown in FIG. 3 by pre-processing the sensor signals either directly in sensor 19 or in a downstream processing unit. A square-wave signal having a defined width is generated for each positive switching edge. In the context of a rotation of the shaft in a first direction, as is the case at times t1, t2, t3, t4, and t5, a square-wave signal having a defined width of, for example, 45 μs is generated. When a rotation of the shaft in a direction opposite to the first direction is ascertained, a signal of a different width is generated, as shown at time t6 in FIG. 3.

Figure 4:
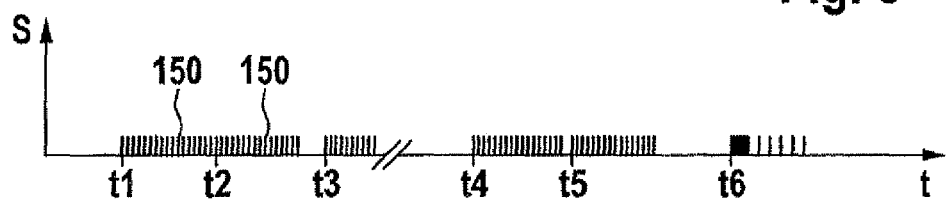
FIG. 4 shows further post-processed signals that are derived from the signals of FIG. 2.

FIG. 4 shows, in particular, position signals or position pulses 150 that are generated between two pulses of sensor 19.

The signal at time t6 is clearly distinguishable in terms of its width. For example, the signal that is associated with time t6 can have a width of 90 μs. As depicted in FIG. 3, the width of these signals is shown as being exaggeratedly wide. A comparison of FIGS. 3 and 4 therefore results in an overlap of the signals, i.e. in FIG. 4 further signals, which are based on an evaluation of the width of the signals of FIG. 3, are already generated. This is not a real effect, however, but is caused only by the exaggerated width of the depiction in FIG. 3. Because of this difference in width, the rotation direction information can additionally be used for post-processing of the signals of sensor 19. German Patent Application No. DE 199 33 844 A1, for example, describes the manner in which it is possible to ascertain the direction in which the shaft is moving.

Also, however, other sensors, or multiple assemblages of offset sensors, with which the rotation direction of the shaft can likewise be detected can be used. As depicted in FIG. 3, the width of these signals is shown as being exaggeratedly wide. A comparison of FIGS. 3 and 4 therefore results in an overlap of the signals, i.e., in FIG. 4 further signals, which are based on an evaluation of the width of the signals of FIG. 3, are already generated. This is not a real effect, however, but is caused only by the exaggerated width of the depiction in FIG. 3. Because of this difference in width, the rotation direction information can additionally be used for post-processing of the signals of sensor 19. German Patent Application No. DE 199 33 844 A1, for example, describes the manner in which it is possible to ascertain the direction in which the shaft is moving.

In FIG. 3, for example, a change in rotation direction is depicted by way of the signals between times t5 and t6. Starting at time t6, at which the fact that the motor is now running in reverse was detected, the address pointer is no longer incremented, but instead decremented. Storage of the subsequent times now occurs not in a specific sequence, but in a reverse sequence. In accordance with this sequence, further calculations are then take into account the fact that the further values are then stored in that sequence.

Figure 5:
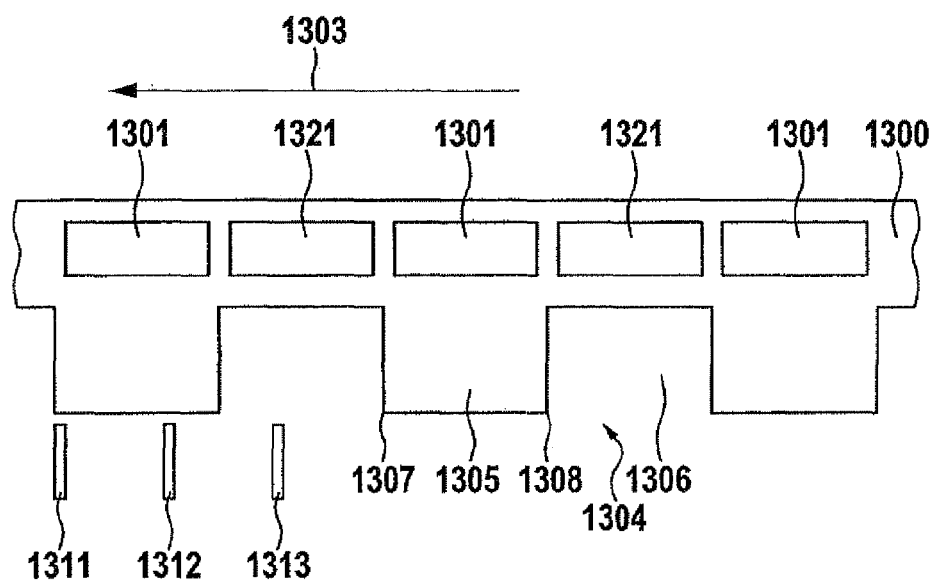
FIG. 5 shows a sensor apparatus for generating a position signal in the context of an electric motor.
Figure 6:
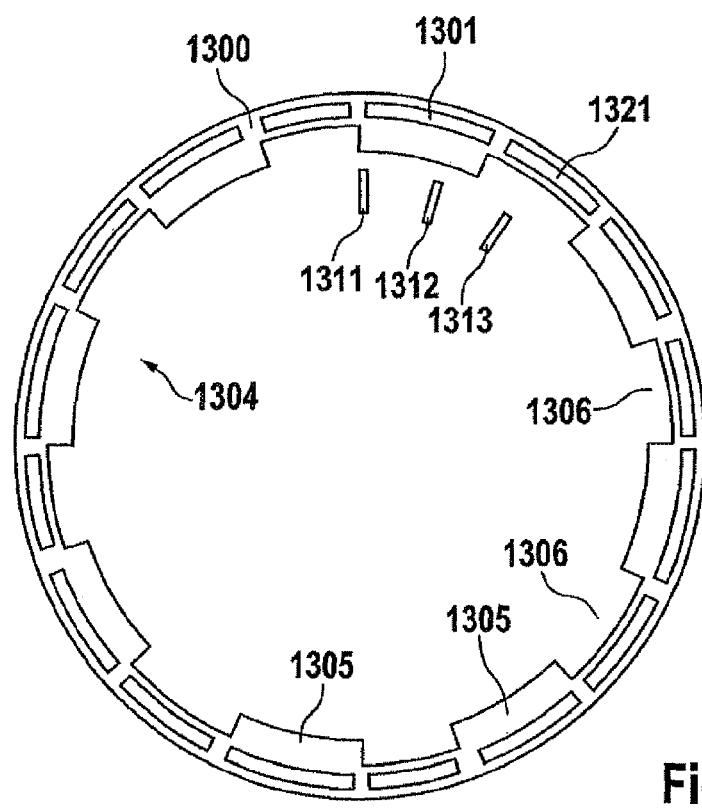
FIG. 6 shows a rotor of an electric motor.

FIG. 5 schematically depicts a rotor 1300 of an electric motor. Rotor 1300 is depicted here not as a round rotor but in a developed depiction, i.e., not as a round entity around a shaft but as a linear entity. This depiction of rotor 1300 serves only for simplified graphical depiction in FIG. 5. In reality, rotor 1300 is embodied as a circular structure around a shaft, as shown in FIG. 6.

FIG. 6 depicts, once again as an overview, rotor 1300 of an electric motor. The electric motor is one having eight pole pairs, i.e., eight North poles 1301 and eight South poles 1321, disposed alternatingly with one another. Associated with each pole pair 1301, 1321 is a tooth structure 1304 having a tooth 1305 and a tooth gap 1306. This Figure serves to show the overall configuration of the rotor. Details of the association between sensors and tooth gaps are explained in the more detailed depiction of FIG. 5.

Embedded in rotor 1300 are permanent magnets 1301, 1321 that, thanks to the application of alternating external magnetic fields by corresponding coils in the stator of the motor, generate a force with respect to the field of permanent magnets 1301, 1321 that moves rotor 1300, for example, in the direction shown by arrow 1303. The corresponding activation coils are not depicted here. Permanent magnets 1301 form a magnetic North pole, and permanent magnets 1321 a magnetic South pole.

Rotor 1300 has tooth structures 1304 that are each made up of a tooth 1305 and a tooth gap 1306. Rotor 1300 is thicker in the region of tooth 1305, i.e., it forms tooth 1305, and rotor 1300 is thinner in the region of tooth gap 1306, thus forming tooth gap 1306. Tooth 1305 possesses a front side 1307 and a back side 1308, where front side 1307 characterizes the transition from tooth gap 1306 to tooth 1305, and the back side characterizes the transition in the motion direction of arrow 1303 between tooth 1305 and tooth gap 1306. For the discussion to follow, tooth structure 1304 shown at the left in FIG. 5 will now be referred to as a "first tooth structure," and the next tooth structure at the center of FIG. 5 as a "second tooth structure" 1304.

The rotor is constructed so that each pair of permanent magnets 1301, 1321 has a tooth structure 1304 associated with it. Disposed opposite tooth structures 1304 are three sensors 1311, 1312, 1313, the spacing of these sensors from one another being selected so that it corresponds in each case to one-third of the periodicity of tooth structures 1304. This means that the spacing between first sensor 1311 and second sensor 1312 corresponds to one-third the spacing of front sides 1307 of two successive tooth structures 1304. With this disposition of sensors 1311, 1312, 1313 and tooth structures 1304, the behavior in the context of a motion of rotor 1300 in the direction of arrow 1303 is such that a defined sequence of signals of the three sensors occurs. Sensors 1311, 1312, 1313 always deliver a logical "one" when a tooth 1305 is located directly in front of them, and a logical "zero" when a tooth gap 1306 is located in front of sensors 1311, 1312, 1313.

As depicted in FIG. 5, for example, the situation is that sensors 1311 and 1312 are outputting a logical "one" and sensor 1313 a logical "zero." When rotor 1300 then moves along in the direction of arrow 1303, the signal level changes as soon as sensor 1312 is beyond back side 1308 of the first tooth. Sensor 1311 is still located opposite tooth 1305, while sensors 1312 and 1313 are both located opposite tooth gap 1306. The sensors therefore deliver the output signal "100". Upon a further motion, sensor 1313 then goes past front side 1307 of second tooth 1305, and the signal of the sensors then changes to the value "101". When rotor 1300 then moves further, both sensors 1311, 1312 are then located over tooth gap 1306 of the first tooth structure, and third sensor 1313 is in front of tooth 1305 of the second tooth structure.

The sensors thus output the signal "001". As motion continues, this is followed by the signal "011" and, upon another further motion, by the signal "010." When rotor 1300 then moves along again, the signal "110" is then outputted again, the sensors then being located in front of the second tooth structure 1304 in the manner shown in FIG. 5 with regard to the first tooth structure 1304. For a motor having p pole pairs, the angle between the sensors (1311 to 1312 and 1312 to 1313) is 360°/(3*p), i.e., in the present case with eight pole pairs, 15°. A change in exactly one sensor value then occurs for every 7.5-degree rotation of the rotor. Upon further motion in the direction of arrow 1303, this signal sequence—namely 110, 100, 101, 001, 011, 010—is repeatedly outputted. When the electric motor is moving in the opposite direction, however, this signal sequence occurs in the reverse order, so that a motion of the electric motor in one or the other direction can be clearly distinguished.

Post-processing of the signals of the three sensors 1311, 1312, 1313 is accomplished, for example, by way of a signal processing apparatus in a manner similar to that already described for the signals of sensor 19. Whenever a signal of sensors 1311, 1312, or 1313 changes in terms of signal level, the storage device reads in from a timer the arrival time of the signal, and stores that time in a memory. Storage in the memory occurs in a predefined sequence, i.e., for example the arrival time of the signal transition from "110" to "100" is stored in one memory location, from which it is then clear that the arrival time of the signal transition from "100" to "101" is then stored in a further memory location. Because sensors 1311, 1312, and 1313 altogether exhibit only six states (the states "000" and "111" do not occur, as described above with regard to the sequence), storage in only six memory locations results in storage of one complete motion of rotor 1300 through one pole pair 1301, 1321. Motion of the rotor with respect to one pole pair is referred to as one "electrical revolution," while motion with respect to all eight pole pairs is referred to as one "mechanical revolution." In order to investigate other influences on rotation speed as well, however, it may also be useful to provide a greater number of memory locations (e.g., for one complete mechanical revolution). The stored times are managed by a corresponding address pointer. By way of the ascertained signal sequence of the three sensors 1311, 1312, and 1313, the rotation direction of the electric motor at each signal change can be determined. This information can be used to correspondingly count the address pointer in one direction or the other. A plurality of position pulses 150 are generated on the basis of the stored times, and then indicate the respective position of the electric motor. In contrast to a combustion engine, however, it is not necessary to map one complete motion of rotor 1300; all that is necessary for the purpose of applying control to the electric motor is to know the position of one pole pair, since the same initial position exists again when the rotor rotates one pole pair further. This is the case, however, only when all the pole pairs are positioned exactly identically. If there are physical differences in the poles, it may be useful also to store measured values for one entire mechanical revolution of the motor, since it is then possible to access, if applicable, the measured values for one revolution ago. The possible deviations are described in detail below in an example.

A further address pointer and corresponding memory locations can optionally be provided even for the electric motor. In contrast to the evaluation of crankshaft signals, however, what is stored in these memory locations is not information regarding the teeth to be expected, but instead information with regard to production tolerances of the encoder wheel of the electric motor, or the disposition of the three sensors 1311, 1312, 1313. These data contain information as to how many position pulses 150 are to be expected before the arrival of the next signal transition. Production tolerances can relate to the signal sequence, proceeding periodically and successively, of the six possible states of the sensors; for example, because of production fluctuations in the encoder wheel, in the disposition of the permanent magnets or of the gaps 1305 or teeth 1306 in the rotor, the duration of the transition in sensor values from "110" to "100" may differ, at a continuous rotation speed, from the duration of the transition from "011" to "010". These deviations then repeat every six signal changes, and can be corrected by way of corresponding correction values at the memory locations, etc. Further correction values can relate to the production tolerances of the entire rotor, for example deviations at tooth structures 1304 that relate to only one point on the entire rotor 1300.

Memory locations for these deviations must then of course be provided for the entire rotor 1300, and a synchronization of the further address pointer with rotor 1300 must occur. This can be accomplished, alternatively, either by way of a further sensor or by identifying a point on rotor 1300 in a manner similar to that in FIG. 1, or by way of a learning procedure. A learning procedure of this kind, in particular, evaluates operating phases of the electric motor with a relatively consistent motor speed, for example an operating phase in which a vehicle driven by the electric motor is coasting. In such phases it is possible to "learn" the differences that exist with regard to arrival of the signal transitions, and corresponding correction information can be stored in the memory locations. This information is then used to output different numbers of position pulses 150 as a function of when the next signal change is expected to arrive.

Figure 7:
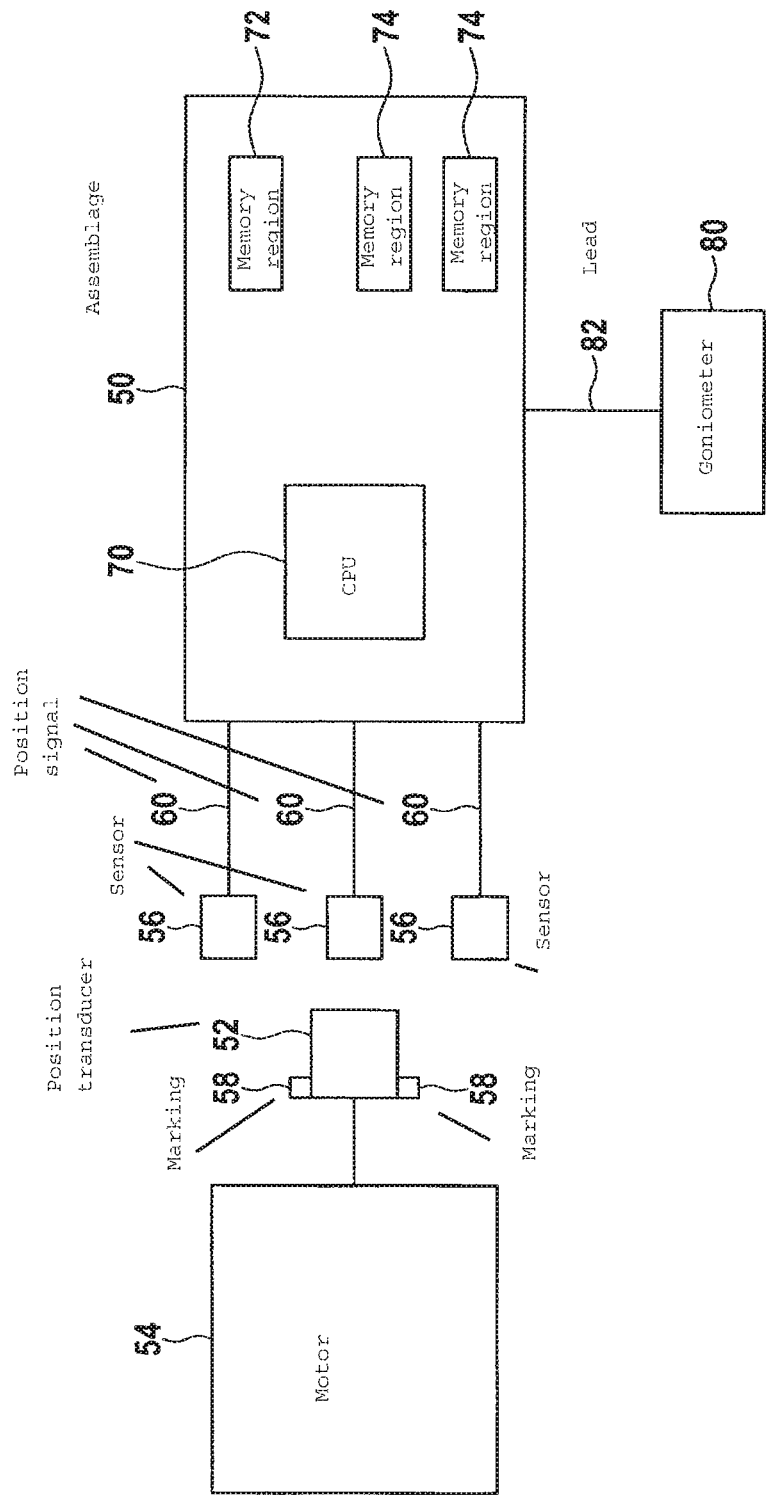
FIG. 7 schematically depicts an embodiment of the assemblage presented, for carrying out the method described.

FIG. 7 depicts an assemblage for carrying out the method, labeled in its entirety with the reference number 50. This assemblage 50 serves for systematic consideration or handling of errors in the transfer of position information or position signals with a position transducer 52 that is provided on a motor 54.

Also depicted are three sensors 56 that, on the basis of markings 58 of position transducer 52, generate position signals 60 as a function of the position, for example the angular position, of said transducer, and thus as a function of the position and/or motion or motion direction of motor 54. Position signals 60 of the individual sensors 56 can be combined with one another for further processing.

A central calculation unit or CPU 70 is provided in circuit assemblage 50. Also provided are a first memory region 72 and two further memory regions 74. A profile regarding markings 58 of position transducer 52, or regarding spacings between markings 58, is stored in first memory region 72. The profile can be updated or adapted by CPU 70 during operation.

Also depicted is a goniometer 80 that is connected to assemblage 50 via a lead 82 through which pulses are transferred.

Parameters regarding sensed position signals 60 are stored in the two further memory regions 74. An address pointer is incremented at each relevant position signal 60, and a synchronization between position signals 60 and the profile is created as soon as the exact position of the motor is known. This synchronization can be performed by the CPU, by correspondingly setting the address pointers with respect to one another. As soon as this synchronization has been performed, information can be performed from the profile for the output of sub-pulses for goniometer 80, in consideration of the values entered in the profile (missing teeth, failure of a sensor, and design-related deviations).

In a further embodiment of the present invention, the two memory regions 74 can be of different sizes and can each be equipped with a separate address pointer. This is advantageous in particular when the virtual increments for the stored data values sometimes need to be taken into account (e.g., for the time-stamp values of the edges) and sometimes do not (e.g., for the increment duration).

Figure 8:
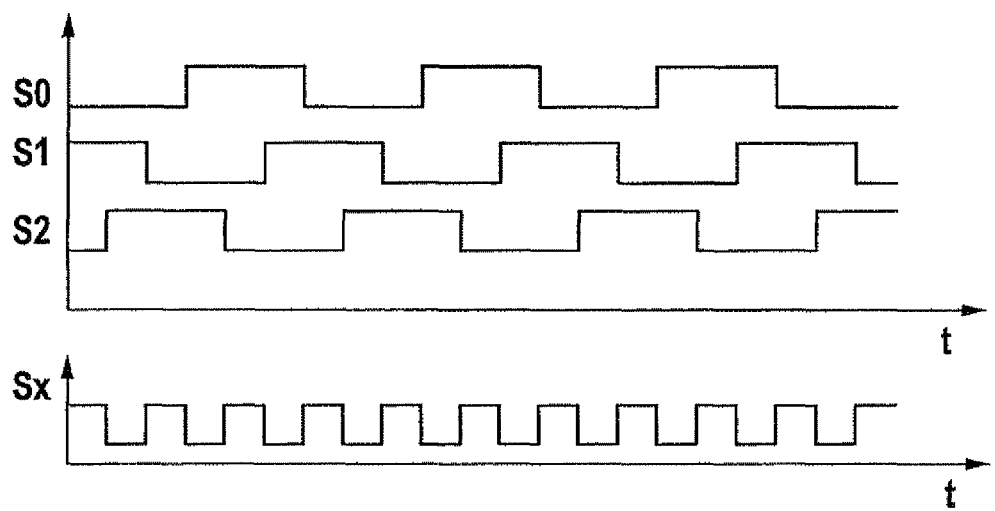
FIG. 8 shows signal sequences of sensors.

FIG. 8 shows signal sequences at three sensors S0, S1, and S2 of an electric motor at constant rotation speed. The three sensors are disposed, in a context of a motor having only one pole pair, so that they are offset 120° from one another. In the example of the motor in question having eight pole pairs, an angle of 15° exists between each of the sensors. A combined signal Sx is created from the three signals by antivalent combination. This signal Sx can then be used in a manner similar to that for the signal of sensor 19 in the context of a combustion engine, except that with Sx each change in the signal, and not only one specific edge, are evaluated.

What is claimed is:

1. A method for systematically handling errors for a goniometer in the context of the transfer of position data with a position transducer, the position transducer possessing markings that are sensed with at least one sensor, the method comprising:
    storing a profile in a first memory region in connection with the markings, the first memory region being addressed by a first address pointer that is incremented with each position signal;
    generating, by the position transducer, on the basis of the markings, position signals that carry, as data, parameters that are stored into at least one further memory region beginning with an address pointer value of a second address pointer, the second address pointer being incremented with each position signal, a synchronization between the parameters in the further memory region and the profile in the first memory region being created based on the two address pointers; and
    modifying a number of pulses output to the goniometer using the values stored in the profile.

2. The method as recited in claim 1, wherein the synchronization is achieved by the fact that an address pointer is correspondingly set by the profile.

3. The method as recited in claim 1, wherein an encoder wheel that possesses teeth disposed in tooth spacings is used as a position transducer, a profile of the tooth spacings being stored.

4. The method as recited in claim 3, wherein at least one memory word is reserved in the profile for each tooth spacing, in which word is provided a field that contains a number of nominal spacing values that is associated with the tooth spacing, and a further field in which a deviation of the tooth spacing from an ideal spacing is entered.

5. The method as recited in claim 1, further comprising:
generating, by the position transducer, pulses that are equipped with a time stamp by a time base;
calculating difference times from a difference in the time stamps; and
calculating, as parameters, time stamps for received pulses, and time spans between each two pulses.

6. The method as recited in claim 1, wherein the second address pointer is incremented when a relevant position signal is present.

7. The method as recited in claim 1, wherein the second address pointer is synchronized with a central computing unit.

8. The method as recited in claim 1, wherein multiple sensors are used, data of which are evaluated separately.

9. The method as recited in claim 8, wherein the data of the sensors are combined with one another.

10. An assemblage for systematically handling errors for a goniometer in the context of the transfer of position data with a position transducer, the position transducer possessing markings that are sensed with at least one sensor, comprising:
a first memory region to receive a profile in connection with markings of the position transducer, the first memory region being configured to be addressed by a first address pointer that is incremented with each position signal; and
at least one further memory region to receive parameters that are generated on the basis of the position signals generated by the markings, wherein the parameters are stored into the at least one further memory region beginning with an address pointer value of a second address pointer, the second address pointer being incremented with each position signal, and a synchronization between the parameters in the further memory region and the profile in the first memory region being created based on the two address pointers;
wherein a number of pulses output to the goniometer is modified using the values stored in the profile.

* * * * *